(12) United States Patent
Hirai et al.

(10) Patent No.: US 7,618,196 B2
(45) Date of Patent: Nov. 17, 2009

(54) WHEEL BEARING APPARATUS

(75) Inventors: Isao Hirai, Iwata (JP); Takayuki Norimatsu, Iwata (JP); Hiroya Kato, Iwata (JP); Akira Fujimura, Iwata (JP); Kikuo Fukada, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/254,913

(22) Filed: Oct. 21, 2008

(65) Prior Publication Data

US 2009/0046971 A1 Feb. 19, 2009

Related U.S. Application Data

(63) Continuation of application No. PCT/JP2007/000427, filed on Apr. 19, 2007.

(30) Foreign Application Priority Data

Apr. 25, 2006 (JP) ............................. 2006-120105
Jun. 16, 2006 (JP) ............................. 2006-167875

(51) Int. Cl.
*F16C 13/02* (2006.01)

(52) U.S. Cl. ........................ 384/589; 384/544

(58) Field of Classification Search ................ 384/537, 384/544, 548, 589, 625
See application file for complete search history.

(56) References Cited

U.S. PATENT DOCUMENTS 6,286,909 B1 * 9/2001 Mizukoshi et al. ....... 301/105.1
6,715,926 B2 * 4/2004 Tajima et al. ............... 384/544
2002/0172444 A1 * 11/2002 Toda et al. ................... 384/544
2003/0012474 A1 * 1/2003 Tajima et al. ............... 384/544
2004/0120622 A1 * 6/2004 Tajima et al. ............... 384/544
2004/0252927 A1 * 12/2004 Hirai et al. .................. 384/544
2005/0141798 A1 * 6/2005 Okasaka ...................... 384/544
2006/0023984 A1 * 2/2006 Terada et al. ................ 384/544
2006/0029316 A1 * 2/2006 Norimatsu et al. .......... 384/544
2007/0122071 A1 * 5/2007 Ohtsuki ....................... 384/589

FOREIGN PATENT DOCUMENTS

JP 11-051064 2/1999
JP 2002-139060 5/2002
JP 2005-195168 7/2005
JP 2006-076346 3/2006
WO WO 2005056309 A1 * 6/2005

* cited by examiner

*Primary Examiner*—Marcus Charles
(74) *Attorney, Agent, or Firm*—Harness, Dickey & Pierce, P.L.C.

(57) ABSTRACT

A wheel bearing apparatus is formed as a unit of a wheel hub and a double row taper roller bearing. An outer member is formed with double row tapered outer raceway surfaces, each opened axially outward, on its inner circumference. An inner member, including the wheel hub, has a wheel mounting flange integrally formed at one end of the wheel hub. On its larger outer diameter side, the inner ring has a larger flange portion to guide the tapered rollers. The at least one inner ring is secured on the wheel hub by a caulked portion. A predetermined hardened layer is formed by high frequency induction hardening over a range from the base of the wheel mounting flange to the cylindrical portion. A position of the inner side end of the hardened layer is set within a range from an edge of a chamfered portion at the caulked side of the inner ring to a position corresponding to a root of the larger flange portion.

5 Claims, 6 Drawing Sheets

[ Fig 7 ]

WHEEL BEARING APPARATUS

CROSS-REFERENCE TO RELATED APPLICATIONS

This application is a continuation of International Application No. PCT/JP2007/000427, filed Apr. 19, 2007, which claims priority to Japanese Application Nos. 2006-120105, filed Apr. 25, 2006 and 2006-167875, filed Jun. 16, 2006. The disclosures of the above applications are incorporated herein by reference.

FIELD

The present disclosure relates to a wheel bearing apparatus to rotatably support a vehicle wheel, such as an automobile and, more particularly, to a wheel bearing apparatus that improves the durability of a wheel hub and an inner ring caulked onto the wheel hub with improved anti-creep properties of the inner ring fitting surface of the wheel hub.

BACKGROUND

The wheel bearing apparatus to support a vehicle wheel is an apparatus that rotatably supports a wheel mounting wheel hub, via double row rolling bearings, including both driving wheels and a driven wheels. For structural reasons, a bearing of the inner ring rotation type is used for a driving wheel and both inner ring rotation and outer ring rotation types are used for a driven wheel. In general, the wheel bearing apparatus is classified into a so-called first-generation type where the wheel bearing comprises double row angular ball bearings fit between a knuckle and a wheel hub. In a second-generation type, the body mounting flange or the wheel mounting flange is directly formed on the outer circumference of the outer member. In a third generation type, one of inner raceway surfaces is directly formed on the outer circumference of the wheel hub. In a fourth generation type, an inner raceway surface is formed directly on the outer circumference of the outer joint member of the wheel hub and the constant velocity universal joint, respectively.

A wheel is rotatably supported relative to a suspension apparatus by a double row rolling bearing. A wheel bearing, including a double row taper roller bearing, is used for heavy loaded vehicles, such as off-road vehicles or trucks. In this wheel bearing, a hardened layer is formed by high frequency induction heating. The layer is on a range from an inner side end of a surface layer portion of the wheel hub to a root portion of a wheel mounting flange (see Japanese Laid-open Patent Publication No. 51064/1999).

Heavy duty vehicle wheel bearings require an increase in the rigidity of the wheel mounting flange of the wheel hub. Thus, the hardened layer is formed to satisfy this requirement. In addition, an inner ring fitting surface in the hardened layer of the wheel hub is required to improve its anti-creep properties.

In a third generation wheel bearing of the inner ring rotation type, the inner ring is fit onto the wheel hub and is axially secured to it by caulking the inner side end of the wheel hub. This type is a mainstream in wheel bearings for a driven wheel. FIG. 6 shows a representative example of this type of wheel bearing. This third generation type wheel bearing includes an inner member 51, an outer member 60, and double row balls 55, 55 contained between the inner and outer members 51, 60. The inner member 51 includes a wheel hub 52. An inner ring 53 is press fit onto the wheel hub 52 via a predetermined interface. In descriptions below, the term "outer side" defines a side that is positioned outside of the vehicle body (a left-hand side in drawings). The term "inner side" defines a side that is positioned inside of the vehicle body (a right-hand side in drawings) when the wheel bearing apparatus is mounted on the vehicle body.

The wheel hub 52 is integrally formed with a wheel mounting flange 54 at one end. Also, it includes an inner raceway surface 52a and a cylindrical portion 52b axially extending from the inner raceway surface 52a. The inner ring 53, formed with an inner raceway surface 53a on its outer circumference, is press fit onto the cylindrical portion 52b. It is axially secured relative to the wheel hub 52 by a caulked portion 52. The caulked portion is formed by plastically deforming, radially outwardly, the end of the cylindrical portion 52b.

The outer member 60 is integrally formed with a body mounting flange 60b on its outer circumference. The body mounting flange 60b is adapted to be mounted on a body of a vehicle. The outer member 60 inner circumference has double row outer raceway surfaces 60a, 60a. A plurality of balls 55, 55 are freely rollably held by cages 56, 56 between the outer and inner raceway surfaces 60a, 52a; 60a, 53a. In addition, seals 57, 58 are mounted on both ends of the outer member 60. The seals prevent leakage of grease contained within the wheel bearing and ingress of rain water or dusts into the wheel bearing.

A heat treated layer 59 is formed in a surface layer portion. It is formed over a range from the cylindrical portion 52b of the wheel hub 52 to a root portion 54a of the wheel mounting flange 54. As shown in FIG. 7, the position "A" of the inner side end of the heat treated layer 59 is set within a range at a distance of 8 mm or less from the inner side end face (larger end face) of the inner ring 53 and of the outer side from an edge "B" of a chamfered portion 53c of the inner circumference of the inner ring 53. This makes it possible to axially secure the inner ring 53 by caulking. This improves the rigidity of the wheel mounting flange 54 and the anti-creep properties of the cylindrical portion 52b of the wheel hub 52. Also, it prevents deterioration of life of the wheel bearing due to deformations of the inner ring 53 and the inner raceway surface 53a caused by the caulking (see Japanese Laid-open Patent Publication No. 76346/2006).

SUMMARY

In the wheel bearing apparatus with the double row angular ball bearing of the prior art, loads such as moment load etc. are supported by the raceway surfaces 52a, 53a, 60a and balls 55. On the other hand in the wheel bearing apparatus with the double row taper roller bearing, the load is not only supported by the raceway surfaces and taper rollers but by larger flange (s) of the inner ring(s) that guide the taper rollers. Accordingly, if the inner ring is deformed by the caulking process, the tapered rollers cannot be properly guided due to a so-called "flange falling" effect which is a deformation of the larger flange toward the raceway surfaces. Thus, the rotational torque of the bearing is increased and accordingly the fuel consumption of vehicle is deteriorated. In addition, the life of the bearing is also deteriorated by excessive temperature increase caused by increased contact pressure between the raceway surface and the tapered rollers.

It is, therefore, an object of the present disclosure to provide a wheel bearing apparatus intended to improve the durability of a wheel hub and an inner ring caulked onto the wheel hub while improving the anti-creep properties of an inner ring fitting surface of the wheel hub.

To achieve the above mentioned object, a wheel bearing apparatus is provided that is formed as a unit. The unit has a wheel hub and a double row taper roller bearing. An outer member is formed with double row tapered outer raceway surfaces on its inner circumference. The double row tapered outer raceway surfaces each open axially outward. An inner member, including a wheel hub, has a wheel mounting flange integrally formed at one end. A cylindrical portion axially extends from the wheel mounting flange. It includes at least one inner ring fit onto the cylindrical portion of the wheel hub via a predetermined interference. Each inner ring is formed on its outer circumference with one of the tapered double row inner raceway surfaces arranged opposite to one of the double row outer raceway surfaces. On its larger outer diameter side, it has a larger flange portion for guiding the tapered rollers. Double row tapered rollers are rollably arranged between the outer and inner raceway surfaces via cages. The inner ring or rings are secured on the wheel hub by a caulked portion. The caulked portion is formed by plastically deforming the end of the cylindrical portion radially outward. A predetermined hardened layer is formed by high frequency induction hardening over a range from the base of the wheel mounting flange to the cylindrical portion. A position of the inner side end of the hardened layer is set within a range from an edge of a chamfered portion at the caulked side of the inner ring to a position corresponding to a root of the larger flange portion.

The wheel bearing apparatus of the first through third generation types comprises a wheel hub with a wheel mounting flange integrally formed at one end. A cylindrical portion axially extends from the wheel mounting flange. At least one inner ring is fit onto the cylindrical portion of the wheel hub via a predetermined interference. Each inner ring is formed with a taper inner raceway surface on its outer circumference. One of the tapered double row inner raceway surfaces is arranged opposite to one of the double row outer raceway surfaces. On its larger outer diameter side, a larger flange portion is present to guide the tapered rollers. A predetermined hardened layer is formed by high frequency induction hardening over a range from the base of the wheel mounting flange to the cylindrical portion. A position of the inner side end of the hardened layer is set within a range from an edge of a chamfered portion at the caulked side of the inner ring to a position corresponding to a root of the larger flange portion. Thus, it is possible to improve the durability of the wheel hub with the fretting wear at the fitting surface of the inner ring being suppressed. Also, it is possible to minimize the radial expansion of the end of the cylindrical portion of the wheel hub. Thus, it is possible to suppress deformation of the inner raceway surface and the larger flange portion of the inner ring during the caulking process. Accordingly, it is possible to obtain smooth guiding of the tapered rollers while suppressing the contact pressure between the rollers and the inner ring and thus to improve the durability of the inner ring.

The position of the inner side end of the hardened layer is set within a range between the inner side of a crossing point of a line extended from an inner surface of the larger flange portion of the inner ring and the outer surface of the cylindrical portion and the outer side of the edge of a chamfered portion at the caulked side of the inner ring. This increases the rigidity and strength of the cylindrical portion relative to the force applied to the larger flange portion of the inner side inner ring due to a bending moment loaded on the bearing apparatus. Thus, plastic deformation is not caused in the cylindrical portion itself although when the load or bending moment, which is large enough to cause plastic deformation of the cylindrical portion if the cylindrical portion is not subjected to any heat treatment, is applied to the cylindrical portion.

The position of the inner side end of the hardened layer is set at a distance of 8 mm or less from a larger end face of the inner ring. This makes it possible to reduce radial expansion of the fitting surface of the inner ring during the caulking process. Also, it makes it possible to shift the commencing point of the radial expansion near or to the caulking position. Thus, it is also possible to suppress deformations of the inner ring and inner raceway surface during the caulking process and to extend the life of the wheel bearing apparatus.

An annular recess is formed on the end of the cylindrical portion. The depth of the annular recess is set at a length of 5 mm or less from the larger end face of the inner ring at its caulked side. This obtains a predetermined securing force for the inner ring while keeping the strength and rigidity of the wheel hub and thus easy plastic deformation. Also, it suppresses the hoop stress generated within the inner ring.

The radius of curvature (r) of the chamfered portion is set within a range of 1.0~2.5 mm. This makes it possible to prevent the generation of stress concentration at the root portion of the caulked portion. Also, it prevents the generation of excessive hoop stress in the outer circumference of the inner ring due to increased radial expansion of the cylindrical portion during the caulking process.

The wheel bearing apparatus is formed as a unit of a wheel hub and a double row taper roller bearing. It comprises an outer member formed with double row tapered outer raceway surfaces on its inner circumference. The double row tapered outer raceway surfaces each open axially outward. An inner member includes a wheel hub with a wheel mounting flange formed integrally at one end. A cylindrical portion axially extends from the wheel mounting flange. It includes at least one inner ring fit onto the cylindrical portion of the wheel hub, via a predetermined interference. Each inner ring is formed with one of the tapered double row inner raceway surfaces on its outer circumference. One of the tapered double row inner raceway surfaces is arranged opposite to one of the double row outer raceway surfaces. On its larger outer diameter side, a larger flange portion is formed to guide the tapered rollers. Double row tapered rollers are rollably arranged between the outer and inner raceway surfaces, via cages. The inner ring or rings are secured on the wheel hub by a caulked portion. The caulked portion is formed by plastically deforming the end of the cylindrical portion radially outward. A predetermined hardened layer is formed by high frequency induction hardening over a range from the base of the wheel mounting flange to the cylindrical portion. A position of the inner side end of the hardened layer is set within a range from an edge of a chamfered portion at the caulked side of the inner ring to a position corresponding to a root of the larger flange portion. Thus, it is possible to improve the durability of the wheel hub while the fretting wear at the fitting surface of the inner ring is suppressed. Also, it is possible to minimize the radial expansion of the end of the cylindrical portion of wheel hub. This suppresses deformation of the inner raceway surface and the larger flange portion of the inner ring during the caulking process. Accordingly, it is possible to obtain a smooth guiding of the tapered rollers while suppressing the contact pressure between the rollers and the inner ring. Thus, this improves the durability of the inner ring.

A wheel bearing apparatus is formed as a unit of a wheel hub and a double row taper roller bearing. It comprises an outer member formed with double row tapered outer raceway surfaces on its inner circumference. The double row tapered outer raceway surfaces each open axially outward. An inner member includes a wheel hub with a wheel mounting flange formed integrally at one end. A cylindrical portion axially extends from the wheel mounting flange. At least one inner ring is fit onto the cylindrical portion of the wheel hub via a predetermined interference. Each inner ring is formed with one of the tapered double row inner raceway surfaces on its outer circumference. One of the tapered double row inner raceway surfaces is arranged opposite to one of the double row outer raceway surfaces. On its larger outer diameter side, a larger flange portion is provided to guide the tapered rollers. Double row tapered rollers are rollably arranged between the outer and inner raceway surfaces, via cages. The inner ring or rings is secured on the wheel hub by a caulked portion. The caulked portion is formed by plastically deforming the end of the cylindrical portion radially outward. An annular recess is formed on the end of the cylindrical portion. The depth of the annular recess is set at a length of 5 mm or less from the larger end face of the inner ring at its caulked side. A predetermined hardened layer is formed by high frequency induction hardening over a range from the base of the wheel mounting flange to the cylindrical portion. A position of the inner side end of the hardened layer is set within a range from an edge of a chamfered portion at the caulked side of the inner ring to a position corresponding to a root of the larger flange portion.

Further areas of applicability will become apparent from the description provided herein. The description and specific examples in this summary are intended for purposes of illustration only and are not intended to limit the scope of the present disclosure.

DRAWINGS

Additional advantages and features of the present disclosure will become apparent from the subsequent description and the appended claims, taken in conjunction with the accompanying drawings, wherein:

FIG. 7 is a partially enlarged section view of FIG. 6.

DETAILED DESCRIPTION

Preferred embodiments of the present disclosure will be described with reference to accompanied drawings.

Figure 1:
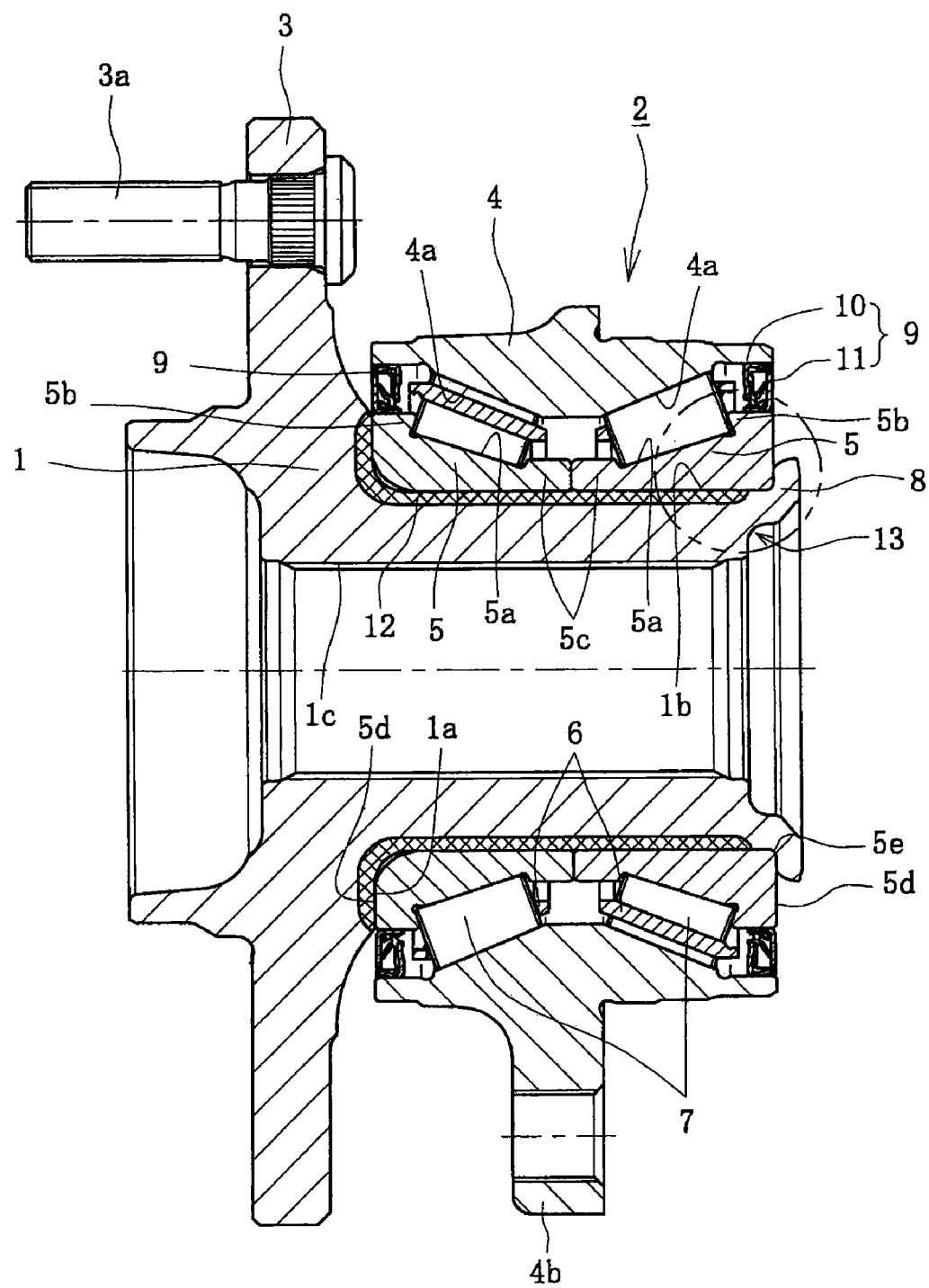
FIG. 1 is a longitudinal-section view of a first embodiment of a wheel bearing apparatus.
Figure 2:
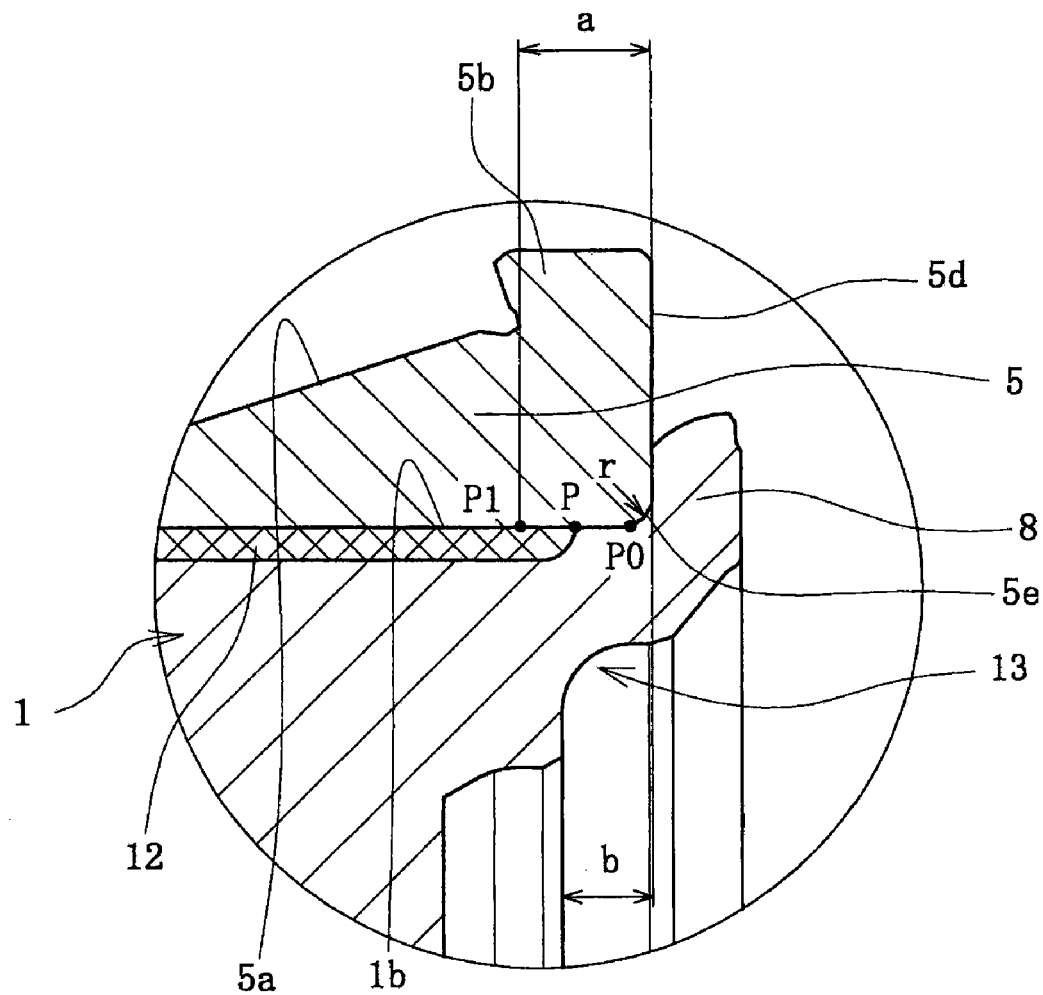
FIG. 2 is a partially enlarged section view of FIG. 1.
Figure 3:
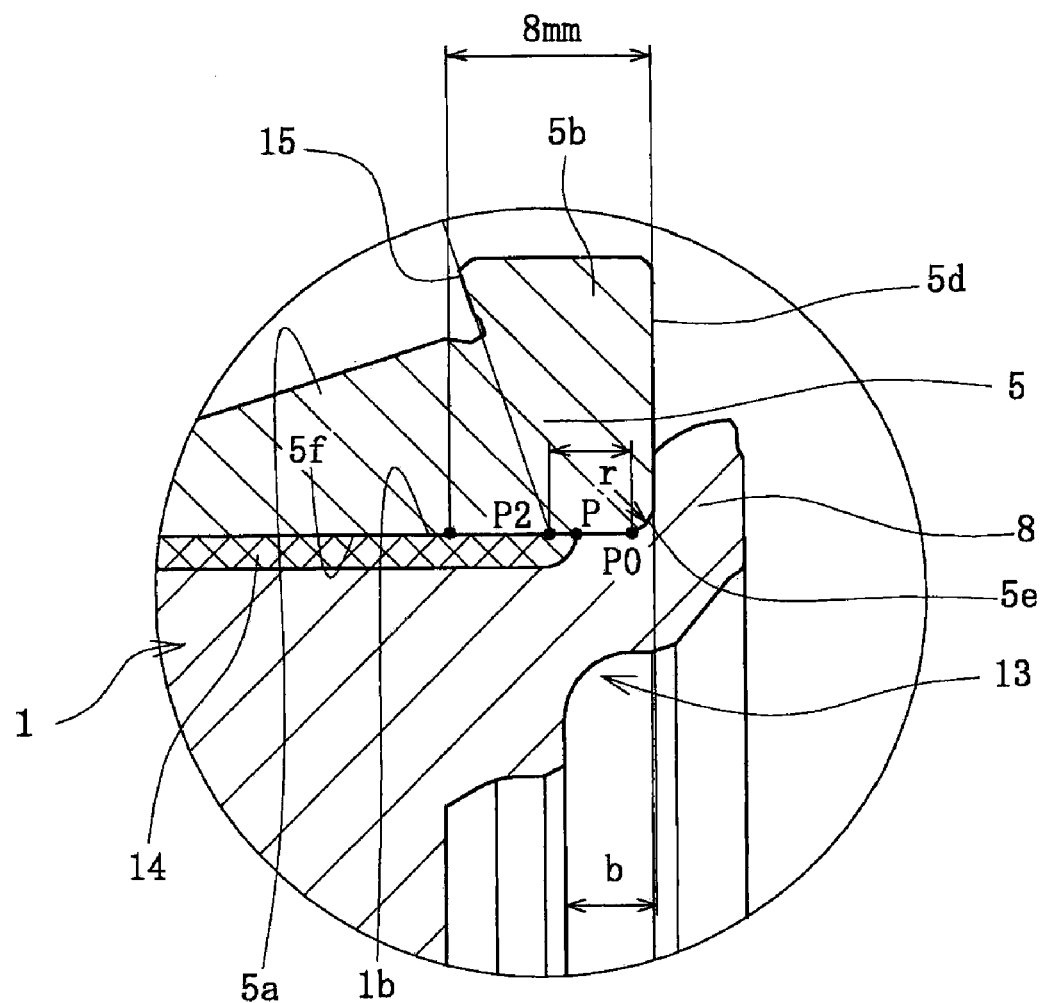
FIG. 3 is a partially enlarged section view of a modified embodiment of FIG. 2.
Figure 4:
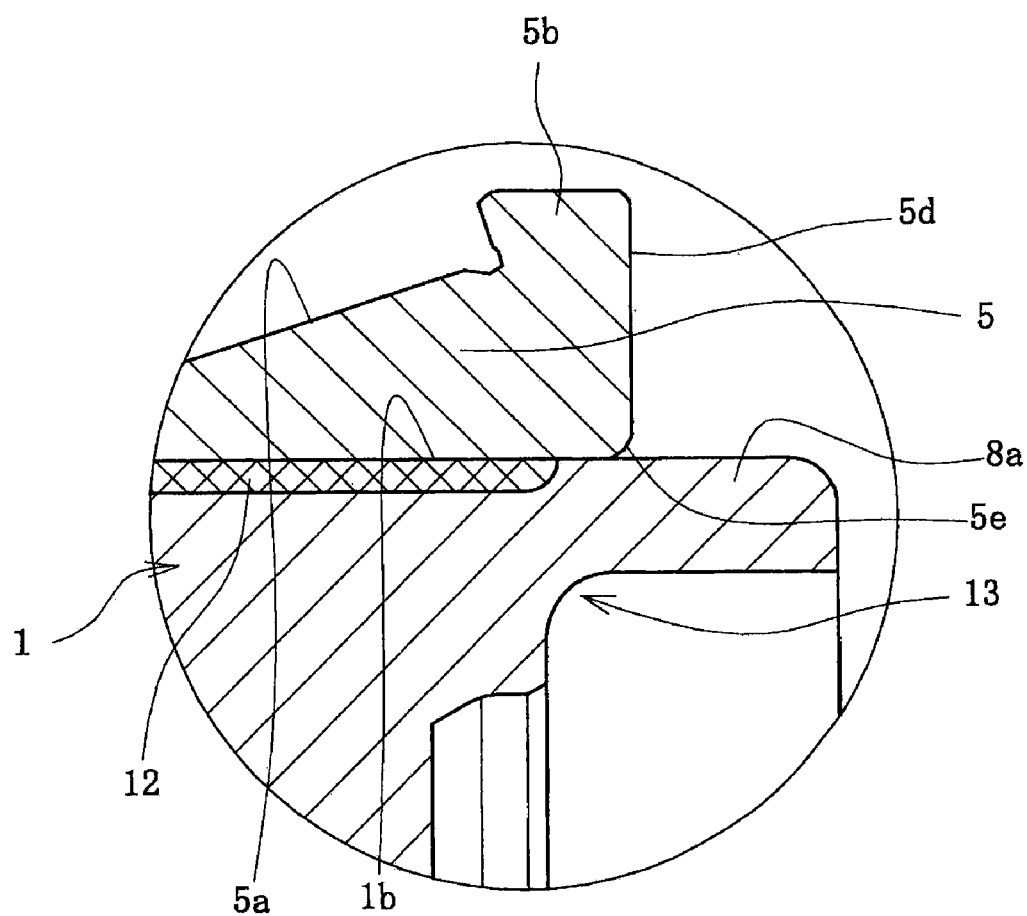
FIG. 4 is a partially enlarged section view of FIGS. 2 and 3 showing a condition prior to the caulking process.

FIG. 1 is a longitudinal-section view of a first embodiment of a wheel bearing apparatus. FIG. 2 is a partially enlarged section view of FIG. 1. FIG. 3 is a partially enlarged section view of a modified embodiment of FIG. 2. FIG. 4 is a partially enlarged section view of FIGS. 2 and 3 prior to caulking. In the description below, the term "outer side" of the wheel bearing apparatus denotes a side that is positioned outside of the vehicle body. The term "inner side" of the wheel bearing apparatus denotes a side that is positioned inside of the vehicle body when the wheel bearing apparatus is mounted on the vehicle body.

The wheel bearing apparatus of FIG. 1 has a second generation type structure for a driving wheel. It includes a wheel hub 1 and a wheel bearing 2 fit onto the wheel hub 1. The wheel hub 1 is integrally formed with a wheel mounting flange 3 at the outer side end portion. A cylindrical portion 1b axially extends from the wheel mounting flange 3, via a shoulder portion 1a. The cylindrical portion 1b is formed, with a serration (or spline), on its inner circumference. Hub bolts 3a are mounted equidistantly along the periphery of the wheel mounting flange 3.

The wheel mounting bearing 2 includes an outer member 4. The outer member 4 has a body mounting flange 4b integrally formed on its outer circumference. Tapered and outwardly opened double row outer raceway surfaces 4a, 4a are formed on the outer member inner circumference surface. A pair of inner ring 5, 5 is each formed with a tapered inner raceway surface 5a on its outer circumference. The inner raceway surface 5a oppositely corresponds to each of the double row outer raceway surfaces 4a, 4a. Double row tapered rollers 7, 7 are rollably contained between the outer and inner raceway surfaces, via cages 6. A larger flange 5b is formed on a larger diameter end of each inner ring 5 to guide the tapered rollers 7. A smaller flange portion 5c is formed on the inner ring smaller diameter end to prevent the tapered rollers 7 from falling off of the inner raceway surface 5a. The pair of the inner ring 5, 5 are arranged on the cylindrical portion 1b so that their smaller end faces of the smaller flange portions 5c abut one another to form a double row tapered roller bearing of a so-called back-to-back duplex bearing.

The outer member 4 and the inner ring 5, 5 are made of high carbon chrome bearing steel such as SUJ2. They are hardened to their core by dip hardening to have a hardness of 58~64 HRC. The outer member 4 may also be made of medium carbon steel such as S53C (JIS SC carbon steels for machine structural use) including carbon of 0.40~0.80% by weight. At least the double row outer raceway surfaces 4a, 4a are hardened by high frequency induction hardening to have a surface hardness of 58~64 HRC.

The wheel bearing 2 is press fit onto the cylindrical portion 1b of the wheel hub 1 via a predetermined interference. Thus, the outer side larger end face 5d of the inner ring 5 abuts the shoulder 1a of the wheel hub 1 and is secured in an axial direction to have a predetermined pre-load. Prior to caulking deformation, the caulking portion 8 remains as a cylindrical portion 8a projecting from the inner side end of the wheel hub 1. The caulked portion 8 is formed by plastically deforming the cylindrical portion 8a radially outward (see FIG. 4). The caulking of the cylindrical portion 1b provides a self-retaining structure that can maintain a stable pre-load for a long term without controlling the pre-load by adjusting the fastening torque of a fastening nut.

Seals 9, 9 are arranged at both annular space openings formed between the outer member 4 and the inner rings 5, 5. Each seal 9 includes an annular sealing plate 10 and a slinger 11. Both have a substantially "L" shaped cross section and are arranged oppositely to each other to form a so-called pack seal. These seals 9, 9 prevent leakage of lubricating grease contained within the bearing and ingress of rain water or dust into the bearing. Although illustrated as a second generation type for a driving wheel, it should be noted that the present disclosure may be applied to that of a driven type and also to a first generation type or third generation type bearing assembly where the outer side inner raceway surface is directly formed on the wheel hub.

The wheel hub 1 is made of medium carbon steel such as S53C including carbon of 0.40~0.80% by weight. It is formed with a hardened layer 12 (shown by a cross-hatching in drawings) with a hardness surface of 50~64 HRC. It is hardened by high frequency induction hardening from the shoulder portion 1a, which forms a base of the wheel mounting flange 3 to the cylindrical portion. The caulking portion 8 remains after forging to have a surface hardness of less than 25 HRC.

As shown in FIG. 2, a position "P" of the inner side end of the hardened layer 12 is set within a range from an edge "P0", of a chamfered portion 5e at the caulked side of the inner ring 5, to a position "P1", corresponding to a height "a" (i.e. the root of the larger flange portion 5b). Thus, it is possible to improve the durability of the wheel hub 1 with the fretting wear at the fitting surfaces of the inner rings 5, 5 being suppressed. Also, it is possible to minimize the radial expansion of the end of the cylindrical portion 1b of wheel hub 1. Thus, this suppresses deformation of the inner raceway surface 5a and the larger flange portion 5b of the inner ring 5 during the caulking process. Accordingly, it is possible to obtain smooth guiding of the tapered rollers while suppressing the contact pressure between the rollers 7 and the inner ring 5. Thus, this improves the durability of the inner ring 5.

In this embodiment, the radius of curvature "r" of the chamfered portion 5e is set within a range of 1.0~2.5 mm. If the radius of curvature "r" is set less than 1.0 mm, stress concentration is caused at the root portion of the caulked portion 8 and damages, such as micro cracks, is generated when a bending moment is applied to the bearing apparatus during driving of the vehicle. On the other hand, if the radius of curvature "r" is set larger than 2.5 mm, excessive hoop stress in the outer circumference of the inner ring 5 is generated due to increased radial expansion of the cylindrical portion 1b during the caulking process.

In addition, an annular recess 13 is formed on the end of the cylindrical portion 1b of the wheel hub 1. The depth "b" of the annular recess 13 is set less than a predetermined length from the larger end face 5d of the inner ring 5. According to a caulking test carried out by the applicant of the present application, it is found that the larger the depth "b" of the recess 13 the easier the caulking. Thus, the hoop stress generated in the outer circumference of the inner ring 5 is reduced. However, remarkable reduction of stress cannot be expected even though the depth "b" of the recess 13 is set larger than 5 mm (b>5 mm). A predetermined inner ring securing force cannot be obtained due to the lack of pushed amount of the inner ring 5. Thus, the strength and rigidity of the wheel hub 1 are reduced.

FIG. 3 shows a modification of the previous embodiment shown in FIG. 2. This modification is different from the first embodiment of FIGS. 1 and 2 only in the range of the hardened layer. Thus, the same reference numerals are used as those used in the first embodiment. The repeating of the descriptions will be avoided.

In this modification, the position "P" of the inner side end of the hardened layer 14 is set within a range between the inner side of a crossing point "P2" of a line extended from an inner surface 15 of the larger flange portion 5b of the inner side inner ring 5 and the outer surface of the cylindrical portion 1b and the outer side of the edge "P0" of a chamfered portion 5e at the caulked side of the inner ring 5 (condition (i)). In addition, the position "P" of the inner side end of the hardened layer 14 is set at a distance of 8 mm or less from a larger end face 5d of the inner ring 5 (condition (ii)). The position "P" of the inner side end of the hardened layer 14 is set within a range satisfying both conditions (i) and (ii).

Since the position "P" of the inner side end of the hardened layer 14 is set at the inner side of a crossing point "P2" of a line extended from an inner surface 15 of the larger flange portion 5b of the inner ring, it is possible to increase the rigidity and strength of the cylindrical portion 1b relative to the force applied to the larger flange portion 5b of the inner side inner ring 5 due to a bending moment loaded on the bearing apparatus. Thus, plastic deformation is not caused in the cylindrical portion itself although load or bending moment, which is large enough to cause plastic deformation of the cylindrical portion if the cylindrical portion 1b is not subjected to any heat treatment, would be applied to the cylindrical portion 1b.

In addition, since the position "P" of the inner side end of the hardened layer 14 is set at the outer surface of the cylindrical portion 1b and the outer side of the edge "P0" of a chamfered portion 5e, the plastic deformation to form the caulking portion 8 can be easily performed. Thus, it is possible to prevent the generation of cracks in the hardened layer 14 during the caulking process.

In addition, since the position "P" of the inner side end of the hardened layer 14 is set at a distance of 8 mm or less from a larger end face 5d of the inner ring 5 and the hardened layer 14 extends to a region near the larger end face 5d, it is possible to reduce radial expansion of the fitting surface 5f of the inner ring 5 during the caulking process. Thus, it is possible to shift the commencing point of the radial expansion near the caulking position 8. Thus, it is also possible to suppress deformations of the inner ring 5 and inner raceway surface 5a during the caulking process and to extend the life of the wheel bearing apparatus.

Figure 5:
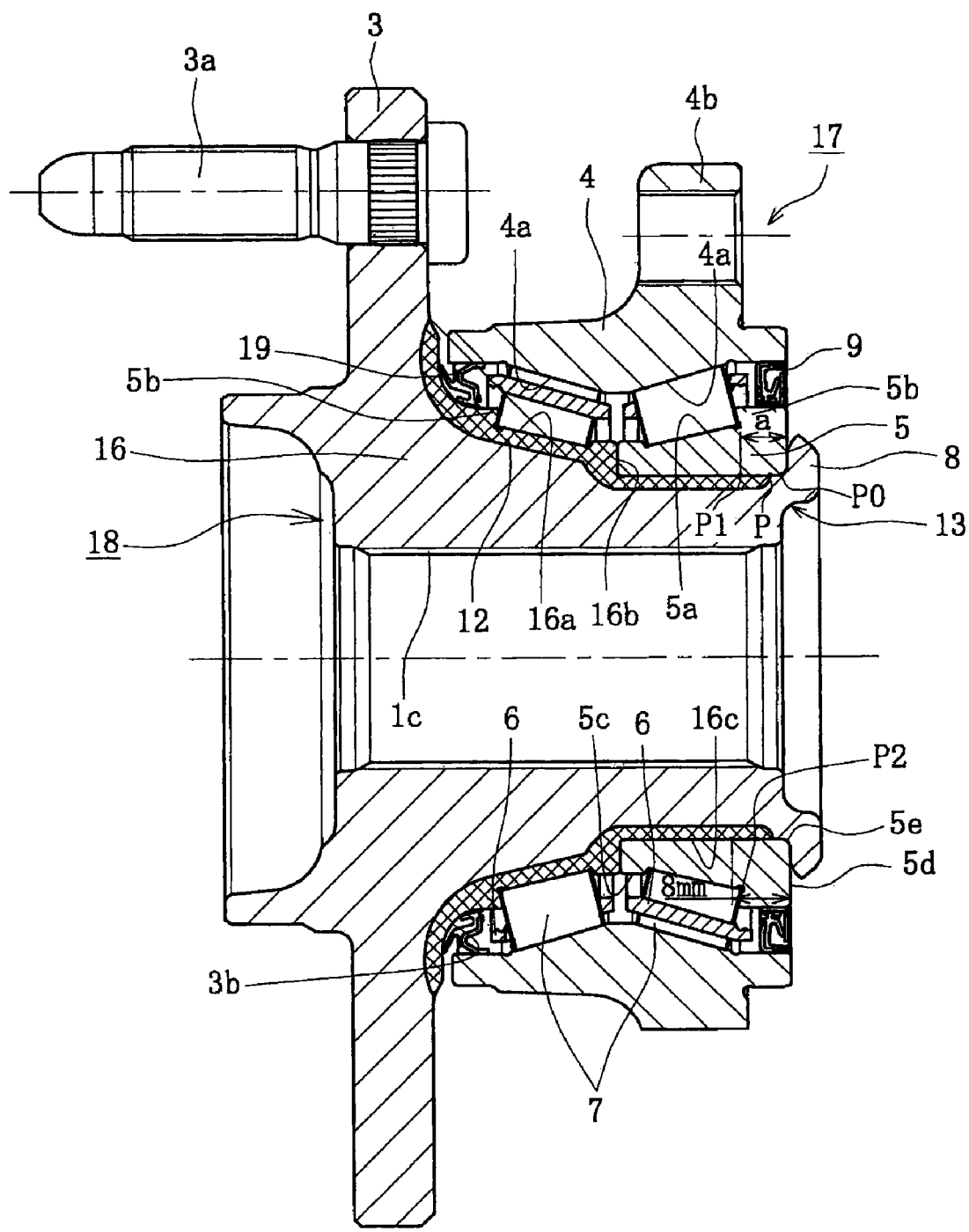
FIG. 5 is a longitudinal-section view of a second embodiment of a wheel bearing apparatus.
Figure 6:
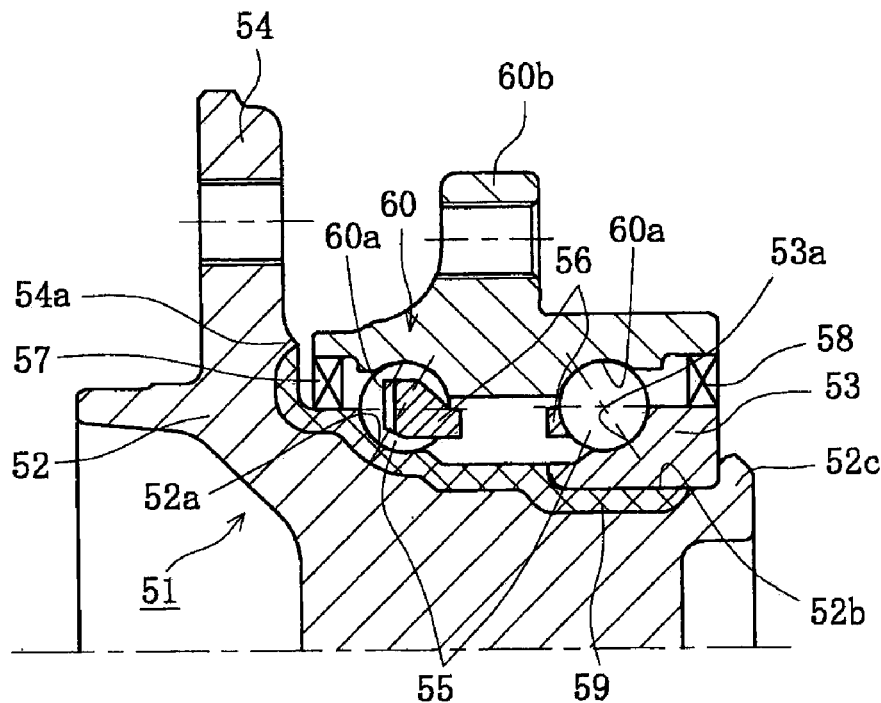
FIG. 6 is a longitudinal-section view of a prior art wheel bearing apparatus.
Figure 6:
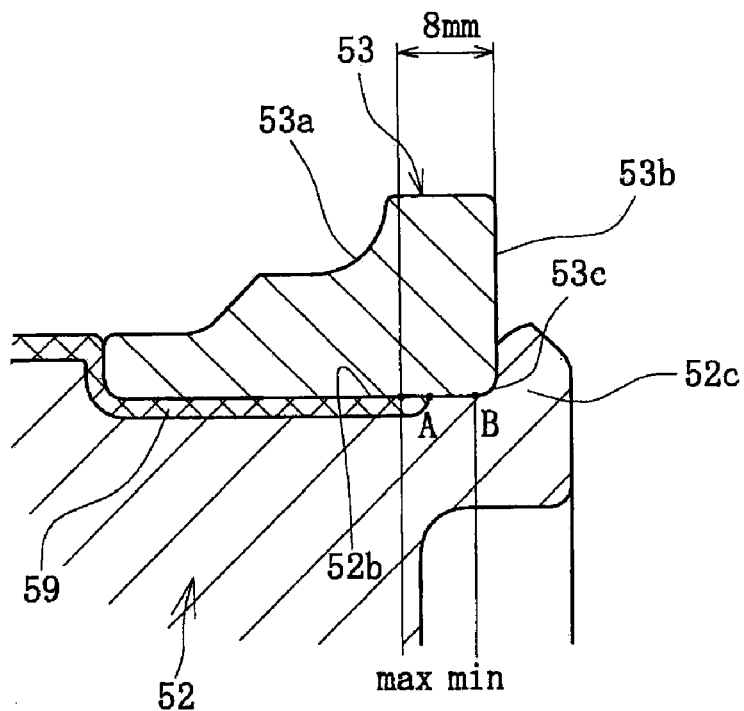

FIG. 5 is a longitudinal-section view of a second embodiment of a wheel bearing apparatus. This embodiment is different from the first embodiment (FIG. 1) only in the structure of the wheel hub. Thus, the same reference numerals are used as those used in the first embodiment and its repeating descriptions will be avoided.

The wheel bearing apparatus of this embodiment has a third generation type structure used for a driving wheel. A wheel hub 16 and a double row tapered roller bearing 17 are formed as a unit. The double row tapered roller bearing 17 includes an inner member 18 with the wheel hub 16 and an inner ring 5 secured on the wheel hub 16. An outer member 4 is mounted around the inner member 18, via tapered rollers 7, 7.

The wheel hub 16 is integrally formed with a wheel mounting flange 3 at the outer side end portion. The wheel hub 16 has a tapered inner raceway surface 16a (outer side) formed on its outer circumference. A cylindrical portion 16c axially extends from the inner raceway surface 16a, via a shoulder portion 16b. A serration (or spline) 1c is formed on the inner circumference of the wheel hub 16. The cylindrical portion 16c is formed on the axially inner side from the longitudinal center of the wheel hub 16. A larger flange portion 5b to guide the tapered rollers 7 is formed on the inner ring 5 at the larger diameter side of the inner raceway surface 16a.

The inner ring 5 is press fit onto the cylindrical portion 16c, via a predetermined interface. An end face of the smaller flange portion 5c of the inner ring 5 abuts against the shoulder portion 16b of the wheel hub 16. The inner ring 5 is also axially secured on the wheel hub 16 by a caulked portion 8. The caulked portion 8 is formed by plastically deforming the end of the cylindrical portion 16c radially outward to apply a predetermined pre-load.

Seals 19, 9 are arranged at both of the annular space openings formed between the outer member 4 and the inner member 18. The outer side seal 19 is a unit type seal with a plurality of sealing lips slidably contacting with the base portion 3b of the wheel mounting flange 3. The seals 19, 9 prevent leakage of lubricating grease contained within the bearing and ingress of rain water or dust into the bearing.

The wheel hub 16 is made of medium carbon steel such as S53C including carbon of 0.40~0.80% by weight. It is formed with a hardened layer 12 (shown by a cross-hatching in FIG. 5) with a surface hardness of 50~64 HRC. It is hardened by high frequency induction hardening over a region from the base portion 3b of the wheel mounting flange 3 to the cylindrical portion 16c. Similar to the first embodiment, a position "P" of the inner side end of the hardened layer 12 is set within a range from an edge "P0" of a chamfered portion 5e at the caulked side of the inner ring 5 to a position "P1" corresponding to a height "a".

Preferably, the position "P" of the inner side end of the hardened layer 12 is set within a range between the inner side of a crossing point "P2" of a line extended from an inner surface 15 of the larger flange portion 5b of the inner side inner ring 5 and the outer surface of the cylindrical portion 16c and the outer side of the edge "P0" of a chamfered portion 5e of the inner ring 5 (condition (i)). In addition the position "P" of the inner side end of the hardened layer 12 is set at a distance of 8 mm or less from a larger end face 5d of the inner ring 5 (condition (ii)). Similarly to the first embodiment, this makes it possible to increase the rigidity of the wheel hub 16 to have a wheel bearing apparatus that is light weight and is compact.

The wheel bearing apparatus of the present disclosure can be applied to the wheel bearing apparatus of first, second or third generation type that includes a wheel hub and a double row tapered roller bearing of a so-called back-to-back duplex type fit onto the wheel hub and the inner ring is secured on the wheel hub by swing motion caulking.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising;
    an outer member formed with double row tapered outer raceway surfaces, each opened axially outwardly on its inner circumference;
    an inner member includes a wheel hub with a wheel mounting flange formed integrally at one end, a cylindrical portion axially extends from the wheel mounting flange, at least one inner ring is fit onto the cylindrical portion of the wheel hub via a predetermined interference, each inner ring is formed with one of a tapered double row inner raceway surfaces on its outer circumference and is arranged opposite to one of the double row outer raceway surfaces, and a larger outer diameter side of said inner ring having a larger flange portion for guiding tapered rollers;
    double row tapered rollers are rollably arranged between the outer and inner raceway surfaces via cages; and
    the at least one inner ring is secured on the wheel hub by a caulked portion, said caulked portion is formed by plastically deforming the end of the cylindrical portion radially outward;
    a predetermined hardened layer is formed by high frequency induction hardening over a range from the base of the wheel mounting flange to the cylindrical portion;
    a position of the inner side end of the hardened layer is set within a range from an edge of a chamfered portion at the caulked side of the inner ring to a position corresponding to a root of the larger flange portion; and
    an annular recess is formed on the end of the cylindrical portion, the depth of the annular recess is set at a length of 5 mm or less from the larger end face of the inner ring at its caulked side, and a depth of the chamfered portion, from the edge of the chamfered portion to the larger end face of the inner ring, is less than the depth of the annular recess so that the hoop stress generated in the outer circumference of the inner ring is reduced.

2. The wheel bearing apparatus of claim 1 wherein the position of the inner side end of the hardened layer is set within a range between the inner side of a crossing point of a line extended from an inner surface of the larger flange portion of the inner ring and the outer surface of the cylindrical portion and the outer side of the edge of the chamfered portion at the caulked side of the inner ring.

3. The wheel bearing apparatus of claim 1 wherein the position of the inner side end of the hardened layer is set at a distance of 8 mm or less from a larger end face of the inner ring.

4. The wheel bearing apparatus of claim 1 wherein the radius of curvature of the chamfered portion is set within a range of 1.0~2.5 mm.

5. The wheel bearing apparatus of claim 2 wherein the position of the inner side end of the hardened layer is set at a distance of 8 mm or less from a larger end face of the inner ring.

* * * * *